May 24, 1927.
A. L. MALLORY
EYESHADE
Filed June 26, 1926
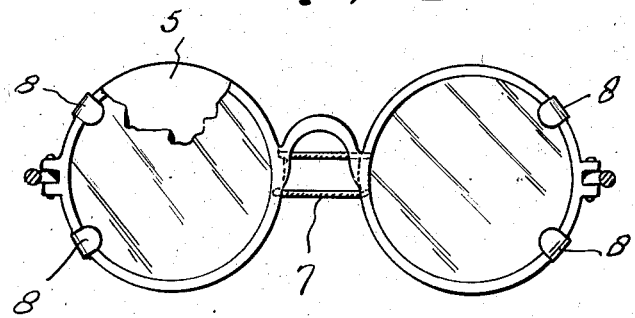
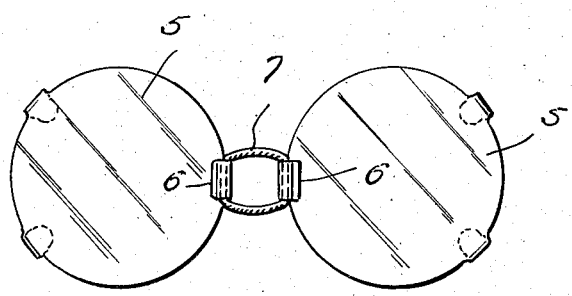
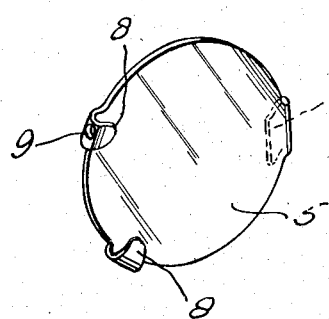
Inventor
Aaron L. Mallory,
By Clarence A. O'Brien
Attorney Patented May 24, 1927.

1,630,193

UNITED STATES PATENT OFFICE.

AARON L. MALLORY, OF ST. PETERSBURG, FLORIDA.

EYESHADE.

Application filed June 26, 1926. Serial No. 118,655.

This invention relates to eye shades for use in conjunction with conventionally constructed eye glasses and that may be quickly positioned over a pair of glasses of any construction whether provided with temples or with nose clips, and to provide a device of this type which will adapt itself to any of the usual types of spectacles or eye glasses and that will retain itself snugly in place.

Other objects will become apparent as the nature of the invention is better understood, the same comprising the novel form, combination, and arrangement of parts hereinafter more fully described, shown in the accompanying drawing and claimed.

In the drawing wherein like numerals indicate like parts throughout the several views:

Figure 1 is a rear elevation of a conventional pair of eye glasses equipped with my improved eye shade, Figure 2 is a front elevation of the eye shade per se, and Figure 3 is a perspective of one of the colored transparent discs of the eye shade.

Referring in detail to the drawing it will be seen that the eye shade comprises a pair of transparent members 5—5 which are of identical construction and similarly contoured. These members are preferably formed from colored celluloid, although obviously other material may be used, celluloid being preferred on account of its flexibility and cheapness.

The members 5—5 are of a shape similar to the shape of the eye glass lenses with which the eye shade is to be used and are formed at their edges with a pair of integral tabs that are bent over upon the members for providing clips 6—6 within which are arranged a band 7 of suitable elastic material for maintaining the members interconnected and for permitting the same to be drawn apart so as to be properly arranged upon the lenses of the eye glasses as disclosed in Figure 1.

At opposite sides of the center line of each disc and at the opposite sides of the band attaching clip 7 each disc is formed with a pair of extension tabs that are bent over and inwardly into spaced relation with the disc for providing a pair of lens rim engaging hooks 8—8 one of which is formed with an opening 9 so that a neck or ear engaging cord may be attached thereto if desired.

It will thus be seen that I have provided a highly novel, simple, and efficient form of eye shade that is adapted for ready application to various forms of eye glasses or spectacles without in any manner whatever marring the spectacles and even though I have herein shown and described the same it is to be understood that minor changes may be made without departing from the spirit of the invention and the scope of the appended claims.

Having thus described the invention, what I claim as new and desire to secure by Letters Patent is:—

In an eye shade for spectacles, a pair of transparent colored discs adapted to be positioned upon the lenses of a pair of spectacles, a clip formed on the inner side edge of each disc and disposed inwardly in spaced relation with respect to the outer face of each disc, an elastic member having its end portion engaged within the opposed clips formed at the inner opposed edges of the discs, for resiliently interconnecting the discs and a pair of clips formed on the outer side edge of each disc, said last mentioned pair of clips being arranged equi-distant from the clip on the inner side edge of each disc, the outer clips being bent inwardly in spaced relation with respect to the inner face of the disc and adapted to engage over the rims of the lenses of the spectacles, one of said outermost clips having an opening for attaching a suspension cord thereto.

In testimony whereof I affix my signature.

AARON L. MALLORY.